(12) United States Patent
Tomiyama et al.

(10) Patent No.: US 6,879,460 B2
(45) Date of Patent: Apr. 12, 2005

(54) MAGNETIC RECORDING DISK DRIVE

(75) Inventors: Futoshi Tomiyama, Hachioji (JP); Takehiko Hamaguchi, Fuchu (JP); Toru Matsushita, Kokubunji (JP); Hideki Zaitsu, Kokubunji (JP); Reijiro Tsuchiya, Fujisawa (JP); Hisashi Takano, Kodaira (JP)

(73) Assignee: Hitachi Global Storage Technologies Japan, Ltd., Kanagawa-ken (JP)

(*) Notice: Subject to any disclaimer, the term of this patent is extended or adjusted under 35 U.S.C. 154(b) by 0 days.

(21) Appl. No.: 10/681,211

(22) Filed: Oct. 9, 2003

(65) Prior Publication Data

US 2004/0075937 A1 Apr. 22, 2004

Related U.S. Application Data

(63) Continuation of application No. 09/451,912, filed on Dec. 1, 1999, now Pat. No. 6,657,804.

(30) Foreign Application Priority Data

Dec. 2, 1998 (JP) ............................................. 10-342545

(51) Int. Cl.[7] .............................................. G11B 5/596
(52) U.S. Cl. .............................. 360/77.04; 360/78.04; 360/78.07; 360/60
(58) Field of Search ......................... 360/60, 69, 77.02, 360/77.04, 78.04, 78.05, 78.06, 78.07, 78.08, 78.14, 76; 369/30.11, 30.12, 44.28

(56) References Cited

U.S. PATENT DOCUMENTS

| | | | |
|---|---|---|---|
| 5,270,880 A | | 12/1993 | Ottesen et al. |
| 5,526,201 A | * | 6/1996 | Takata et al. ............. 360/77.04 |
| 5,825,578 A | * | 10/1998 | Shrinkle et al. ......... 360/77.08 |
| 5,986,845 A | | 11/1999 | Yamaguchi et al. |
| 6,046,870 A | | 4/2000 | Karube |
| 6,081,397 A | | 6/2000 | Belser |
| 6,160,674 A | * | 12/2000 | Yun et al. ...................... 360/60 |
| 6,215,608 B1 | | 4/2001 | Serrano et al. |
| 6,556,369 B1 | * | 4/2003 | Kanamaru et al. ............ 360/75 |
| 6,636,375 B1 | * | 10/2003 | Ding et al. .............. 360/77.02 |

FOREIGN PATENT DOCUMENTS

| | | |
|---|---|---|
| JP | 05-094608 | 4/1993 |
| JP | 06-103592 | 4/1994 |

OTHER PUBLICATIONS

IEEE Transactions on Magnetics, vol. 29, No. 6, Nov. 1993, "Recording Asymmetries at Large Skew Angles", K. Wiesen et al, pp. 4002–4004.

IEEE Transactions on Magnetics, vol. 26, No. 5, Sept. 1990, "A Track Density Model for Magnetoresistive Heads Considering Erase Bands", J.K. Lee et al, pp. 2475–2477.

IEEE Transactions on Magnetics, vol. 34, No. 4, Jul. 1998, "Optimal Track–Width Design of AMR/GMR Heads for High–Track–Density Disk Drives", F. Tomiyama et al, pp. 1970–1972.

* cited by examiner

*Primary Examiner*—Thang V. Tran
(74) *Attorney, Agent, or Firm*—Mattingly, Stanger, Malur & Brundidge, P.C.

(57) ABSTRACT

A magnetic recording disk drive can prevent the deterioration of the head off-track characteristics and the reduction of the drive performance even when an erase band asymmetry resulting from a skew angle exists. A write inhibit slice value for an inner peripheral side offset is made smaller than a write inhibit slice value for an outer peripheral side offset at a position where an erase band on the inner peripheral side is greater than an erase band on the outer peripheral side, so that the adjacent track on the outer peripheral side cannot easily erase a data track. On the contrary, the inner periphery and the outer periphery are paraphrased at a position where the erase band on the outer peripheral side is greater than the erase band on the inner peripheral side.

4 Claims, 9 Drawing Sheets

PRIOR ART

PRIOR ART

PRIOR ART

WRITE PROCEDURE:

(1) WRITE DATA TRACK
(2) WRITE INNER ADJACENT TRACK
(3) WRITE OUTER ADJACENT TRACK

WRITE PROCEDURE:

(1) WRITE DATA TRACK
(2) WRITE INNER ADJACENT TRACK
(3) WRITE OUTER ADJACENT TRACK

○ WITH ASYMMETRY : Tww(s)=0.7 μm, EB(s)in=0.20 μm, EB(s)out=0.20 μm
● WITHOUT ASYMMETRY : Tww(s)=0.7 μm, EB(s)in=0.39 μm, EB(s)out=0.01 μm READ TRACK WIDTH CONDITION : 0.55 μm (COMMON)

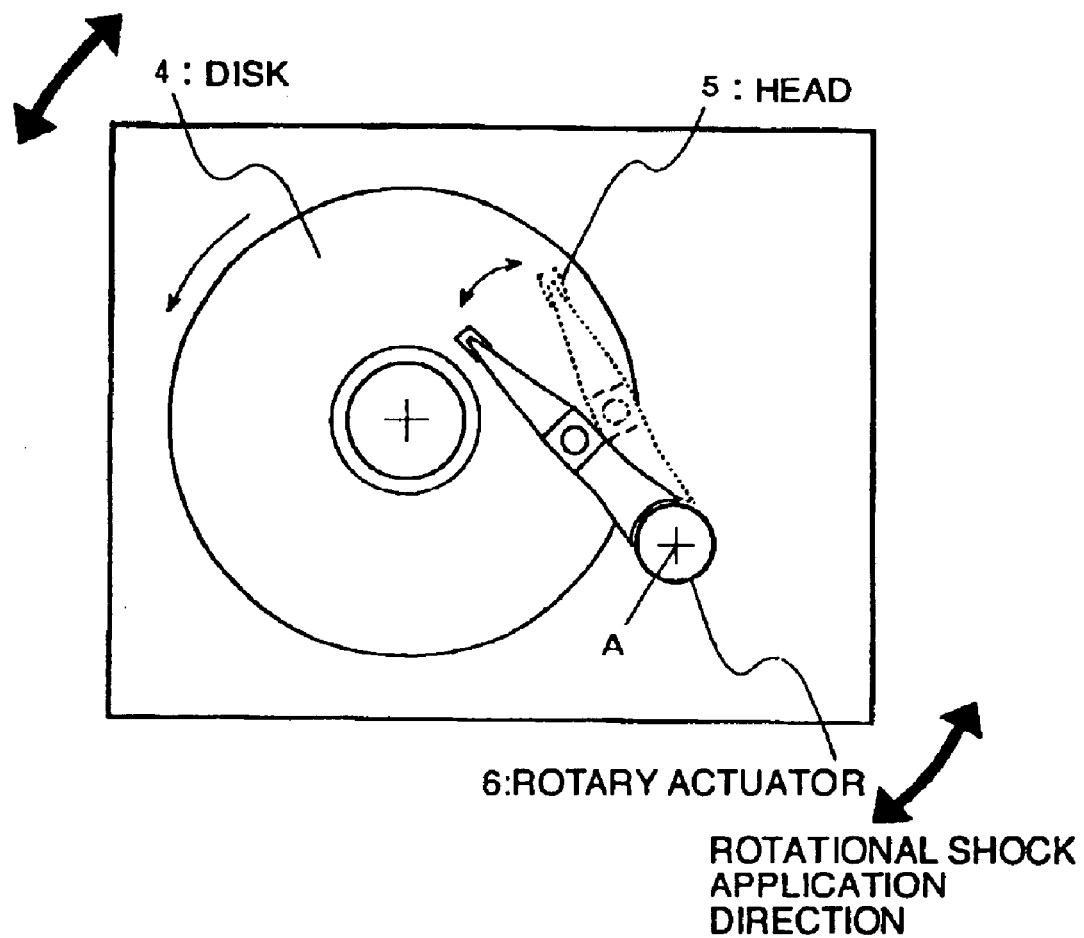

MAGNETIC RECORDING DISK DRIVE

This application is a continuation of U.S. patent application Ser. No. 09/451,912 filed Dec. 1, 1999 now U.S. Pat. No. 6,657,804.

BACKGROUND OF THE INVENTION

The present invention relates to a magnetic recording disk drive. More particularly, the present invention relates to a technology for preventing the deterioration of the head off-track characteristics resulting from the asymmetry of erase band widths which occurs when an angle (hereinafter referred to as a "skew angle") between a relative movement direction of a magnetic head, which executes the data write/read operations, with respect to a recording medium for storing information and a direction of magnetization reversal region formed on the recording medium is not 0 degree.

FIG. 2 shows an observation result of a recording state of information written on a disk by a head, through a magnetic force microscope. Here, data 1 is written on a data 3 written as an old information. As shown in FIG. 2, erase bands 2 (areas for erasing the old information, though new information is not written thereto) exist on the sides of the track for the recorded data 1. In a state in which the head is positioned to a target track (so-called "a following state"), the adjacent tracks are not erased. However, the erase bands 2 erase the information of the adjacent tracks when a write operation is performed before a residual vibration caused by a seek operation (i.e., a settling vibration) is not sufficiently settled immediately after the head is moved from another track, or when the write operation is performed in a state in which a large offset is caused by an external shock. In order to prevent such an accidental data erasure, a conventional magnetic disk drive is generally so constituted as to stop the write operation when an offset greater than a write inhibit slice value determined by the device occurs with respect to a target write track based on position signals acquired every moment.

FIG. 3 illustrates a rotary actuator system which is a predominant system in the existing magnetic disk drives. In the rotary actuator system, an actuator 6 which supports a head 5 rotates with point "A" in the drawing as the center, so that the head 5 moves between tracks in a disk 4 for storing information. As shown in FIG. 4, in the rotary actuator system, angle φ between a relative movement direction of the magnetic head 5, which writes or reads the information, to the disk 4 for storing the information and the direction of a straight line, which connects the device position of the head 5 to the rotary actuator rotation center "A", changes as the head 5 moves from the inner periphery towards the outer periphery. In consequence, as is shown in FIG. 5, angle θ (hereinafter referred to as "skew angle") between a disk travelling direction and a reversal region of magnetization 9 which is formed on the disk 4 changes as the head 5 moves from the inner periphery to the outer periphery. A report has been made to the effect that the presence of this skew angle renders the erase bands asymmetry (K. Wiesen et al., IEEE Trans. Magn., Vol. 29, pp. 4002-4004, 1993).

FIG. 6 schematically illustrates a recorded state on a disk when the information is written to the data track and adjacent tracks where the skew angle is 0 degree. It is assumed that the information is written first to the data track, then to the inner adjacent track, and finally to the outer adjacent track. No difference occurs in the width of the regions erased at the left and right ends of the data tack when the track effectively written has width $T_{ww}$ and the erase band widths on the right and left (which are equal on the inner and outer peripheral sides) are EB as shown in FIG. 6.

FIG. 7 schematically illustrates a recorded state on a disk when the information is written to the data track and adjacent tracks in the same way as in FIG. 6, on the assumption that the skew angle is not 0 degree but takes a finite value. It is assumed also that the information is written first to the data track, then to the inner adjacent track, and finally to the outer adjacent track, in the same way as in FIG. 6. The effective recorded track width is "$T_{ww}(s)$". The erase band width on the inner side is "EB(s)in", and the erase band width on the outer side is "EB(s)out". FIG. 7 shows the state where the erase band width EB(s)in is greater than the erase band width EB(s)out. As shown in FIG. 7, when the information is written at positions having a track pitch spaced apart by Tww(s)+EB(s)out on the adjacent tracks of the data track, the erase band of the outer adjacent track is in touch with the data track region of the data track. Therefore, the data of the data track is destroyed by the outer adjacent track if the track pitch becomes smaller than this track pitch. However, the data in the inner adjacent track, in which the data is recorded with the same distance, is not yet destroyed in the data track region of the data track. It can be thus appreciated that if the inner and outer erase bands of the data track are asymmetric, the recorded data track is first destroyed from one of the adjacent tracks with the decrease of the track pitch.

A 747 curve (J. K. Lee et al., IEEE Trans. Magn., Vol. 26, pp. 2475-2477, 1990) is affected by the presence/absence of the asymmetry of the erase bands. FIG. 8 shows an example of the calculation of the erase band asymmetry dependence on the 747 curve using an algorithm described in article "F. Tomiyama et al., IEEE Trans. Magn., Vol. 34, pp. 1970-1972, 1998". It can be appreciated that the off-track capability reduces in a region having a small track pitch due to the presence of the erase band asymmetry. This results from the fact that a greater one of the right and left erase bands squeezes the adjacent track and starts erasing a part of the information written on the adjacent track.

SUMMARY OF THE INVENTION

Even if the greater one of the right and left erase bands partially erases the adjacent track data and the off-track capability reduces due to the erase band asymmetry, in the conventional magnetic disk drives in which the right and left write inhibit slice values are set to the same value, the sole way to cope with this problem is to reduce the write inhibit slice value as small as possible and to limit it to a strict value in order to protect the data. However, if the write inhibit slice value is set to a small value, the write operation must be inhibited frequently due to the temporary deterioration of the positioning accuracy resulting from the disturbance of a certain limited level. In consequence, latency increases and the drive performance reduces. In order to secure the drive performance, the reduction of the write inhibit slice value must be limited to a minimum necessary value.

This holds true not only of the write inhibit slice value but also of a seek completion slice level. The term "seek completion slice level" represents hereby the slice level at which the completion of the seek operation is judged in the following manner when the head is approaching a target track in the seek operation. The distance of the head from the target track position is compared with a predetermined seek completion slice level, and then the completion is determined when the head distance is smaller than the seek completion slice level. In the same way as is in the case of the write inhibit slice value, even if the residual vibration having the same amplitude is observed between the seek operation from the inner periphery to the outer periphery and the seek operation from the outer periphery to the inner periphery, the squeezed margin between data track and outer adjacent track is different from that between data track and inner adjacent track when the erase band asymmetry exists. For this reason, it has been necessary to limit the seek completion condition to a small range by limiting the seek completion condition to that of the seek operation having the higher likelihood of the data destruction. The reduction of the seek completion slice level results in the increase of the seek time, so that the drive performance is likely to be reduced. Therefore, in the same way as in the case of the write inhibit slice value, the reduction of the seek completion slice level must be limited to a minimum necessary level from the aspect of the drive performance.

With the background described above, the present invention contemplates to prevent the deterioration of the head off-track characteristics and the reduction of the drive performance even if the erase band asymmetry due to the skew angle exists.

Because the outer adjacent track is likely to erase the data track at the position where the erase band on the inner peripheral side is greater than the erase band on the outer peripheral side, the write inhibit slice with respect to the offset for the inner peripheral side is made smaller than the write inhibit slice with respect to the offset for the outer peripheral side.

In the means for solving the problem described above, the inner periphery is paraphrased to the outer periphery at the position where the erase band on the outer peripheral side is greater than the erase band on the inner peripheral side, on the contrary.

The seek completion slice level of the seek operation from the inner periphery to the outer periphery may be set to a different level from that of the seek operation from the outer periphery to the inner periphery, and the seek condition on the side, in which the adjacent track is more likely to be erased, may be set to a severer condition.

BRIEF DESCRIPTION OF THE DRAWINGS

FIG. 10 shows a magnetic recording disk drive according to an embodiment of the present invention.

DESCRIPTION OF THE PREFERRED EMBODIMENTS (First Embodiment)

Figure 1:
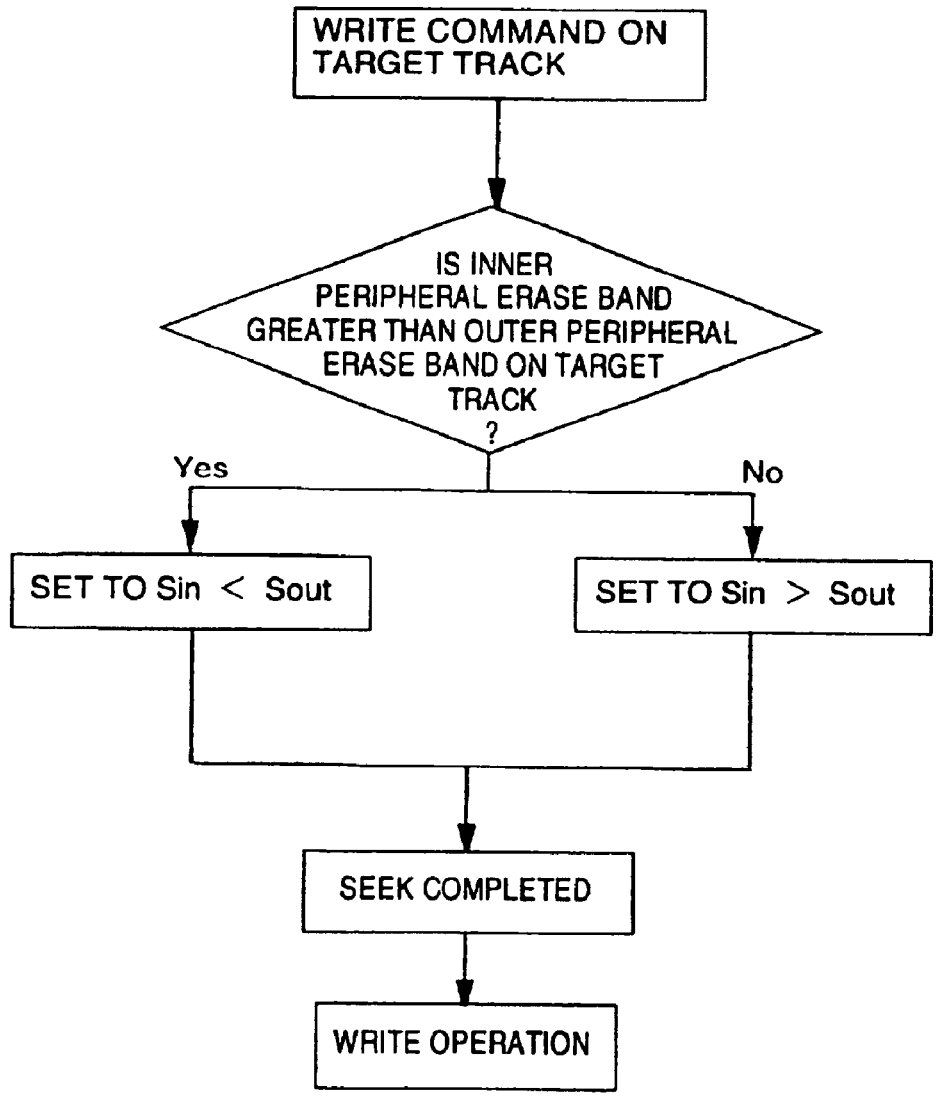
FIG. 1 is a flowchart showing an embodiment of the present invention.
Figure 2:
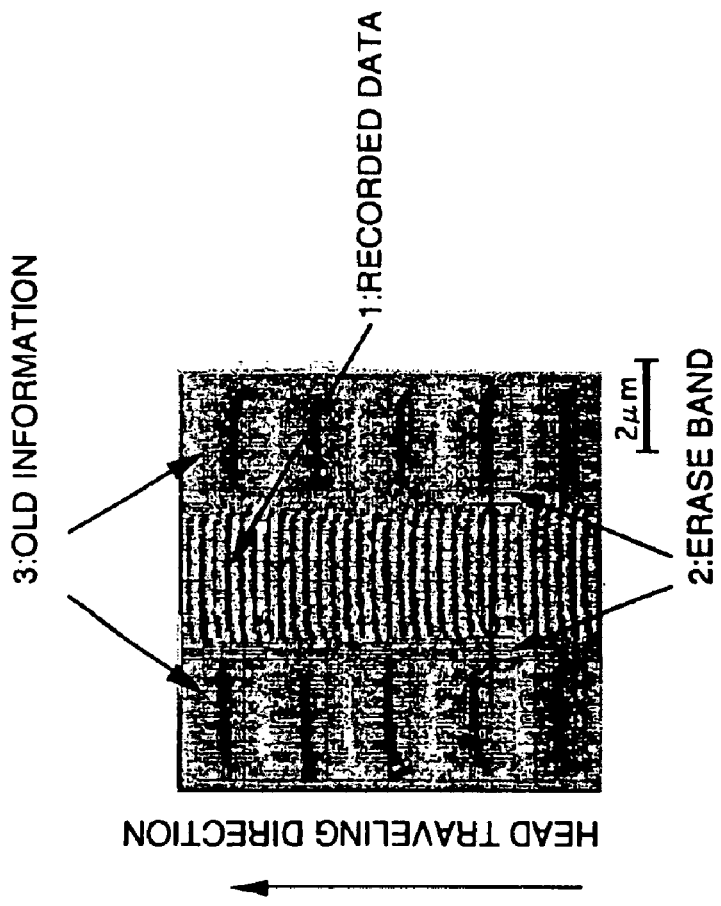
FIG. 2 shows a data recorded condition on a disk using a head.
Figure 3:
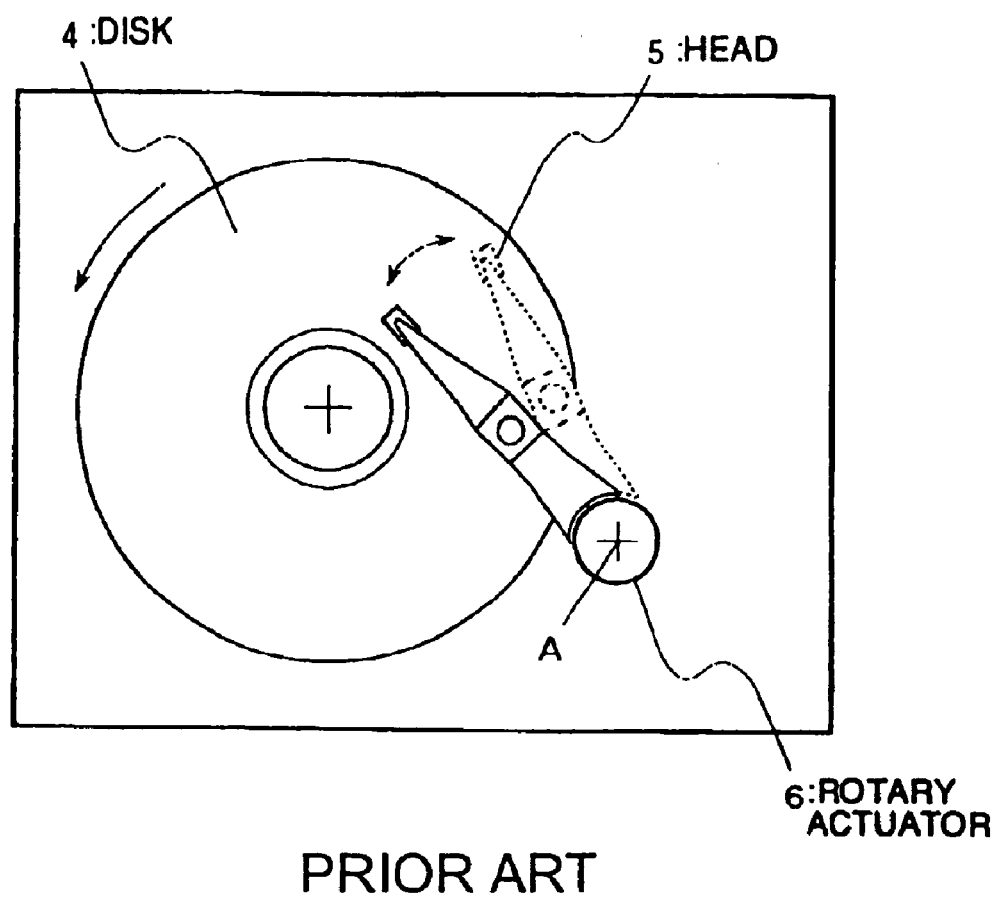
FIG. 3 shows the construction of a magnetic recording disk drive of a rotary actuator system.

A first embodiment of the present invention uses a magnetic recording disk drive of a rotary actuator system. The magnetic recording disk drive has a construction in which an actuator 6 for supporting a head 5 rotates with point "A" in the drawing as the center to move over the disk 4 for storing information. As the magnetic recording disk drive employs the rotary actuator system, the angle $\phi$ between the relative movement direction of the magnetic head 5, which executes the read/write operation of the information, to the disk 4 for storing the information and the straight line which connects the device position of the head 4 to the rotary actuator rotation center "A" changes with moving from the inner periphery towards the outer periphery. FIG. 1 is a flowchart showing the first embodiment of the present invention. After receiving a write command at a target recording track from a controller, the magnetic recording disk drive judges whether or not an erase band on the inner peripheral side is greater than an erase band on the outer peripheral side at the target track. This judgement is executed by storing in advance the information of the erase band asymmetry on the inner and outer peripheral sides in a table form, for example. When the erase band on the inner peripheral side is greater than the erase band on the outer peripheral side, a write inhibit slice level "Sin" for an inner peripheral side offset and a write inhibit slice level "Sout" for an outer peripheral side offset are so set as to satisfy the following relation.

$$Sin < Sout \tag{1}$$

A seek operation for the target track is then executed. After this seek operation is completed, a write operation is executed. This is a setting operation which is conducted in order to prevent the data of the adjacent track on the inner peripheral side from being destroyed by the large erase band on the inner peripheral side. When the write inhibit slice is small, the data can be protected sufficiently against the settling residual vibration, the abnormal vibration and so forth. However, the time necessary before the start of the write operation gets extended. If expression (1) is set as in this embodiment, the mean access time of the disk drive can be improved as a whole in comparison with the measures which reduce both of the write inhibit slice for the inner peripheral side offset and that for the outer peripheral side offset in order to prepare for the worst. This technical concept holds true as such when the erase band on the outer peripheral side is greater than the erase band on the inner peripheral side by merely paraphrasing the "inner periphery" to the "outer periphery".

(Second Embodiment)

Figure 4:
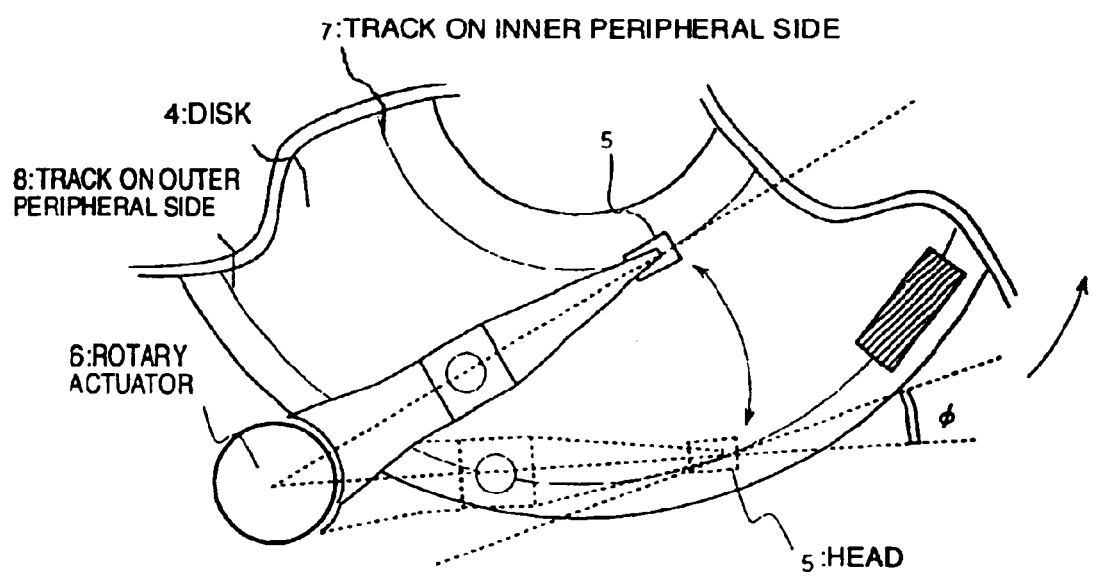
FIG. 4 is a schematic view showing the relation between a magnetic disk and a head in FIG. 3.
Figure 5:
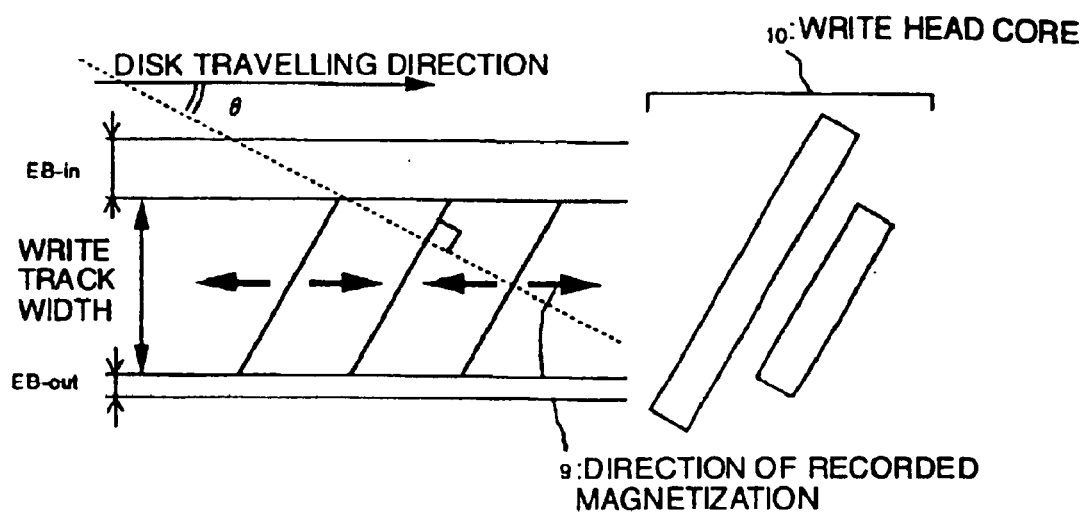
FIG. 5 shows the definition of a skew angle.
Figure 6:
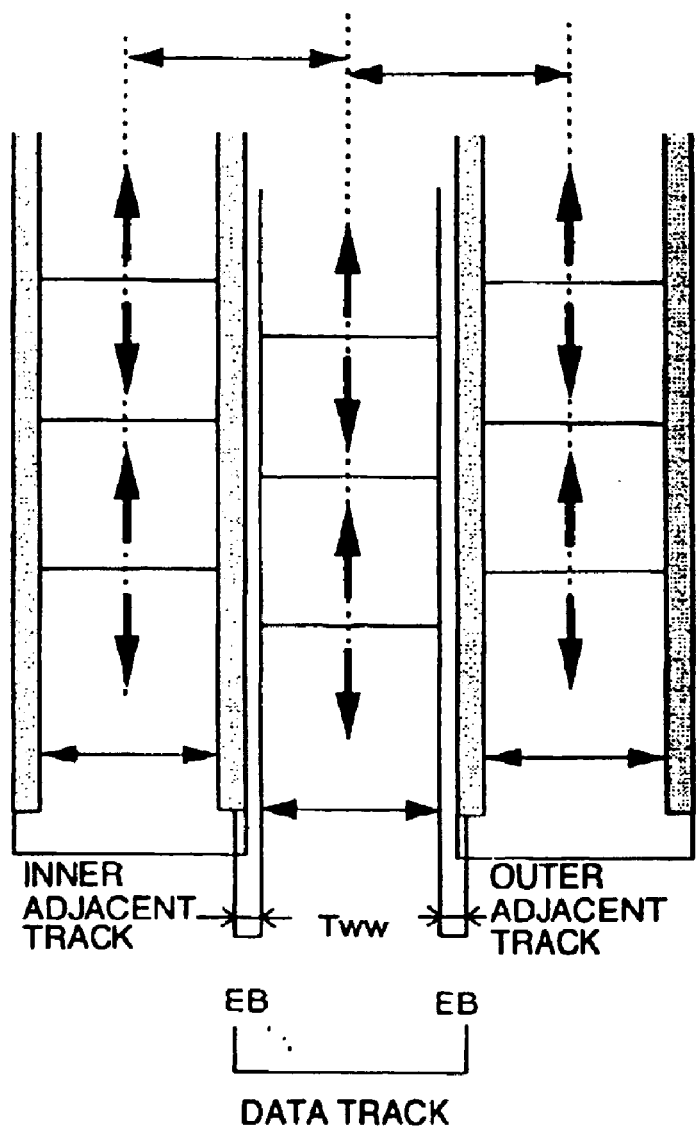
FIG. 6 is a schematic view showing a data recorded condition at the skew angle of 0 degree.
Figure 7:
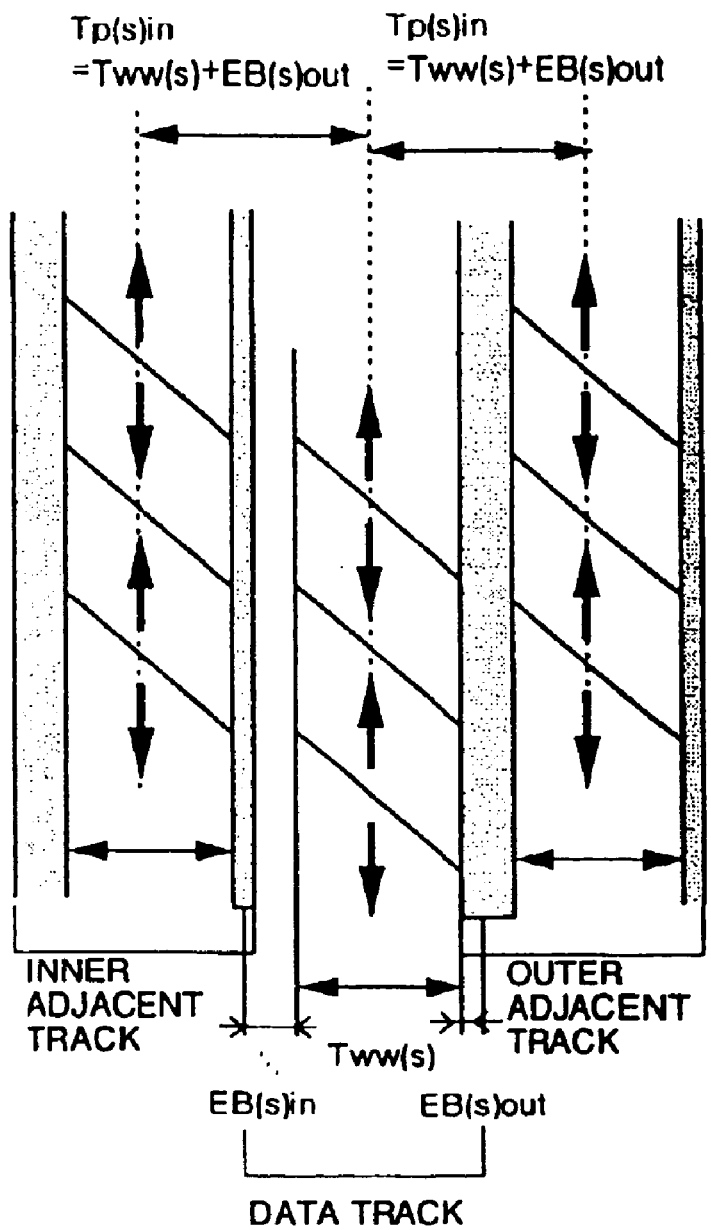
FIG. 7 is a schematic view showing a data recorded condition at the skew angle of greater than 0 degree.
Figure 8:
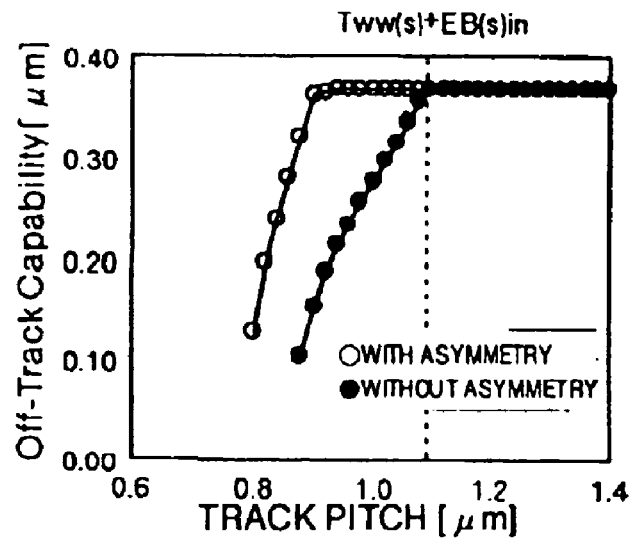
FIG. 8 shows a calculation result of a 747 curve depending on the presence/absence of the erase band asymmetry.

The judgement routine for comparing the size of the erase band on the inner peripheral side with that of the erase band on the outer peripheral side in the first embodiment may be changed to the judgement routine which judges whether or not the skew angle in the target track is greater than the skew angle in the outer adjacent track. Because the radius dependence of the skew angle generally changes continuously as can be anticipated easily from FIG. 4. When the former is greater than the latter, the write inhibit slice for the inner peripheral side offset may be made smaller than the write inhibit slice for the outer peripheral side offset. On the contrary, when the former is smaller than the latter, the write inhibit slice for the outer peripheral side offset may be made smaller than the write inhibit slice for the inner peripheral side offset.

(Third Embodiment)

Figure 9:
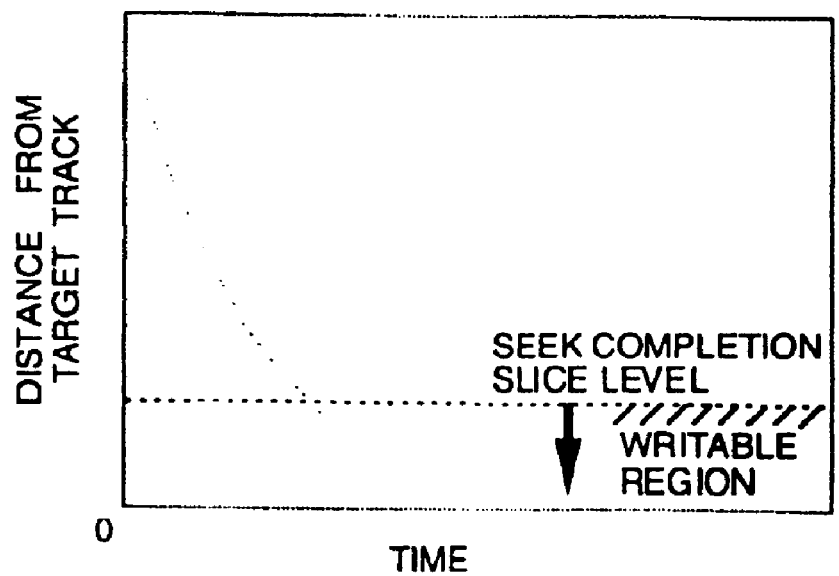
FIG. 9 is an explanatory view of a time response of a position error in the seek operation and a seek completion slice level.

In a magnetic recording disk drive having an algorithm for judging the seek completion by comparing the offset quantity with respect to the target track, which is acquired from a position signal, with a predetermined seek completion slice level, if it is assumed that a settling response waveform as shown in FIG. 9 is exhibited, the write operation can be performed when the position error becomes smaller than the seek completion slice level. Speaking conversely, the write operation is conducted with the position error corresponding to the seek completion slice level. In the same way as in the first embodiment, in the track, in which the erase band on the inner peripheral side is not equal to that on the outer peripheral side, of the tracks which have the non-zero skew angles, the greater erase band is likely to erase the adjacent track. Therefore, the data can be protected by setting the seek completion slice level on the greater erase band side to be smaller than that on the opposite side. Further, the mean seek time can be made shorter than when both of the seek completion slice levels for the inner peripheral side offset and that for the outer peripheral side offset are set to be the same strict value in consideration of the greater erase band.

(Fourth Embodiment)

It is assumed that the head is spaced apart from the target track by the number of tracks which exist on the inner peripheral side at time when the write command for the target track reaches the head, and then the seek operation is started towards the target track therefrom. Generally, when the head crosses the same number of tracks in the seek operation to the target track, the seek time difference between the seek operation from the inner periphery to the outer periphery and that from the latter to the former does not occur due to the structural factors. However, when the head crosses the different number of tracks in the seek operation, the seek time difference develops due to the seek distance difference and the bearing characteristics difference. When the recording target track is a track having the skew angle other than 0 degree, for the seek operation from the inner periphery to the outer periphery and that from the latter to the former in both of which the head crosses the same number of tracks, the seek time in the direction in which the adjacent track data is more likely to be erased due to the erase band asymmetry is set to be greater than the seek time in the opposite direction. Thereby, the write operation can be conducted after the settling vibration is sufficiently settled for the seek operation in the direction in which the data erasure is more likely to occur. As a result, the mean seek time can be shorter than when the seek times in both directions are strictly set to be the same so that the data is erased in the both directions, without inviting the deterioration of the off-track characteristics.

(Fifth Embodiment)

When a rotational shock as shown in FIG. 10 is applied to the magnetic recording disk drive during the write operation, the head is caused to move and offset to the disk within the device in the direction opposite to the angular acceleration application direction to the drive. Therefore, the device so operates as to return the head position to the original position based on the detected position signal in order to correct this offset. It is assumed that when the track having the seek angle other than 0 degree is the target track, the offset over the write inhibit slice occurs due to the angular velocity application. In order to prevent the data erasure at the adjacent tracks resulting from the offset in the direction in which the data erasure is likely to occur due to the erase band asymmetry, an acceleration sensor, for example, is assembled in the magnetic disc drive to detect the shock. When the acceleration sensor detects the shock, the time before the write operation becomes feasible is extended so that the write operation can be started after the offset is sufficiently settled. Thereby, the safety of the data can be insured, and the higher performance can be obtained in comparison with a case where the write starting time in both of the offset directions is set to that having a severer offset.

The embodiments according to the present invention described above can shorten the access time to the target track without erroneously erasing the data of the adjacent tracks.

What is claimed is:

1. A magnetic disk apparatus including an algorithm for determining a seek completion by comparing an offset quantity obtained from a position signal with respect to a target track with a predetermined seek completion slice level, comprising:

a table for setting said seek completion slice level for each of a plurality of tracks, wherein the seek completion slice level is set with reference to said table at a time of a recording.

2. A magnetic disk apparatus comprising:

algorithm means for determining a seek completion by comparing an offset quantity obtained from a position signal with respect to a target track with a predetermined seek completion slice level; and means for setting a different value to the seek completion slice level in a case of seeking from an inner peripheral track to an outer peripheral track and in another case of seeking from the outer peripheral track to the inner peripheral track, when the track having a skew angle other than 0 degrees is a target write track.

3. A magnetic disk apparatus according to claim 2, wherein when said target write track is a track having the skew angle other than 0 degrees, wherein a case where a head exists at a position spaced apart by N tracks on an inner peripheral side with respect to said target track and a case where said head exists at a position spaced apart by N tracks on an outer peripheral side are compared at a time when a write command reaches to said head; and when seek operations in which said head crosses a same number of tracks towards said target write track are performed, a difference time is provided to seek times of the seek operations.

4. A magnetic disk apparatus according to claim 2, wherein when the target write track is the track having the skew angle of other than 0 degrees, a difference time is provided to a time at which a write operation becomes feasible, between a case where a rotational shock having an angular acceleration in a clockwise direction is applied to said magnetic disk apparatus in a write operation and a case where an angular velocity having an equal magnitude in a counter-clockwise direction is applied to said magnetic disk apparatus in said write operation.

* * * * *